United States Patent [19]

Gotanda

[11] Patent Number: 4,580,125

[45] Date of Patent: Apr. 1, 1986

[54] SIGNALING DEVICE FOR PREVENTING AUTOMOBILE THEFT

[76] Inventor: Motohiro Gotanda, 1802-10, Nakabyo, Abiko-shi, Chiba-ken, Japan

[21] Appl. No.: 658,305

[22] Filed: Oct. 5, 1984

[30] Foreign Application Priority Data

Oct. 8, 1983 [JP] Japan ................................ 58-187710

[51] Int. Cl.$^4$ ............................................. B60R 25/04
[52] U.S. Cl. ...................................... 340/64; 340/63; 340/65; 340/541; 340/539; 340/522; 307/10 AT; 180/173; 180/287
[58] Field of Search ...................... 340/64, 63, 65, 540, 340/541, 600, 542, 539, 522, 650, 651, 653, 679; 307/10 AT, 10 R, 116; 180/287, 167, 173, 169

[56] References Cited

U.S. PATENT DOCUMENTS

| | | | |
|---|---|---|---|
| 4,071,007 | 1/1978 | Arix | 180/287 |
| 4,110,734 | 8/1978 | Lepore et al. | 340/64 |
| 4,186,710 | 2/1980 | Kilgore | 340/64 |
| 4,192,400 | 3/1980 | McEwan | 180/287 |
| 4,320,382 | 3/1982 | Roucek | 307/10 AT |
| 4,435,649 | 3/1984 | Vandigriff | 307/10 AT |
| 4,538,136 | 8/1985 | Turner | 340/64 |

Primary Examiner—Donnie L. Crosland
Attorney, Agent, or Firm—Stephen F. K. Yee

[57] ABSTRACT

A protective signaling device for the prevention of theft of an automobile, which is arranged to generate an alarm only when the engine of the automobile is started without the use of its ignition key, i.e. without switching an ignition switch of the automobile on. The device includes a pickup capable of detecting a radio wave generated as an electrical noise when the engine is started and of generating a first detection signal upon detection of the radio wave, and a detector adapted for generating a second detection signal when the ignition switch is in the off position. Means is provided for allowing the actuation of an alarm only upon receipt of both of the first and second detection signals at the same time.

2 Claims, 1 Drawing Figure

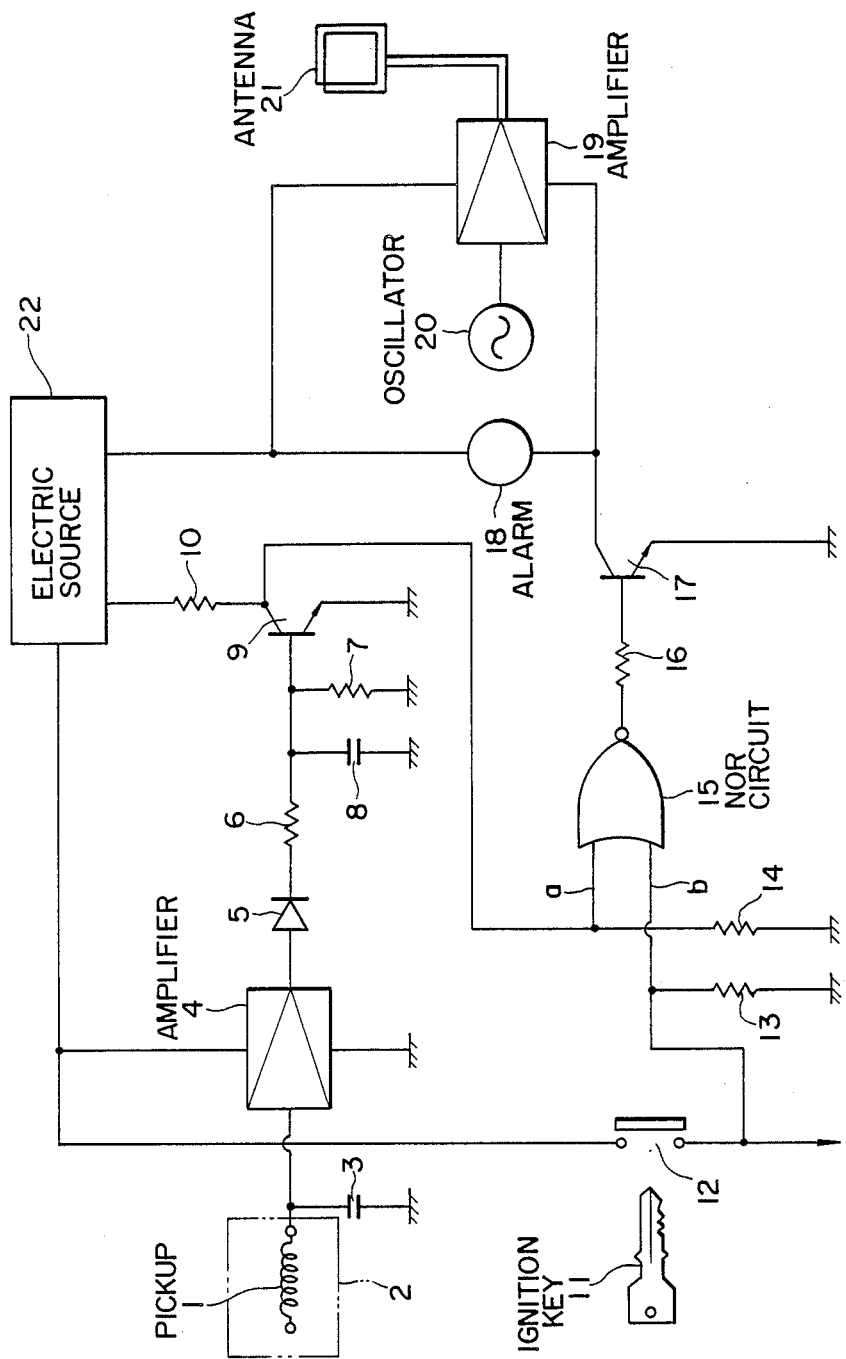

SIGNALING DEVICE FOR PREVENTING AUTOMOBILE THEFT

This invention relates to a protective signaling device for the prevention of theft of an automobile. More specifically, the present invention is directed to such a signaling device arranged to generate an alarm when the engine of the automobile is started without using the ignition key, i.e. without turning the ignition switch on.

Car burglars usually start the engine by directly connecting the ignitor, starter motor and the like with the battery without using the ignition key of the car. Thus, for the prevention of car theft, a system has been generally used wherein an oscillator capable of commencing operation upon start of an engine is provided. By the actuation of the oscillator, an alarm such as a buzzer provided in the automobile or a wireless portable bell rings for signaling the start of the engine. Such a system has a drawback because the alarm starts operating when the operator forgets to turn off the alarm system before starting the engine with the ignition key.

The present invention has been made with a consideration of the above-described drawback of the conventional protective signaling device for automobiles.

In accordance with the present invention there is provided a signaling device for the prevention of an automobile from being stolen, said automobile having an internal combustion engine provided within an engine compartment and adapted for starting operation by turning an ignition switch on with the simultaneous generation of a radio wave, said device comprising:

first detecting means having a pickup provided within the engine compartment for detecting the radio wave generated upon start of the engine and being adapted for generating a first detection signal upon detection of the radio wave;

second detecting means coupled to the ignition switch and adapted for generating a second detection signal when the ignition switch is in the off position;

means coupled to said first and second detecting means and capable of generating an actuation signal only when supplied with both of said first and second detection signals simultaneously; and alarm means having said actuation signal as its input and being adapted for signaling an alarm upon receipt of said actuation signal.

A preferred embodiment of the present invention will now be described with reference to the accompanying drawing, in which the sole FIGURE is a circuit diagram embodying the present invention.

Referring to the FIGURE, the reference numeral 1 denotes a pickup provided in a compartment 2 accomodating an internal combustion engine (not shown) of an automobile. The pickup is capable of detecting a radio wave and of generating a detection output signal upon detection of the radio wave. When the internal combustion engine is started, a radio wave of various frequencies is necessarily generated as an electrical noise due to the spark at the ignitor, the revolution of the starter motor and the like. The pickup can detect such a radio wave, and generate the output signal. The pickup in this embodiment includes an iron core and a conductive wire wound around the core in the form of a coil.

Designated as 3 is a capacitor, 4 an amplifier, 5 a diode, 6 a resistor, 7 a resistor, 8 a capacitor, 9 a transistor, 10 a resistor, 15 a NOR circuit and 22 is an electric source of, for example, DC 12 V. The capacitor serves to cut a high frequency current from the pickup 1. The resulting output is then amplified by the amplifier 4 and is rectified by the diode 5. The rectified current is then filtered by a filter circuit composed of the resistors 6 and 7 and the capacitor 8. The resultant output is fed to the base electrode of the transistor 9. When the transistor 9 is switched on, an "L" signal is fed to the NOR circuit 15 through a line "a".

Referring continuedly to the FIGURE, the reference numeral 11 designates an ignition key capable of closing and opening an ignition switch 12 of an electric ignition circuit (not shown) of the engine. The ignition switch 12 is also coupled to the NOR circuit so that when the ignition 12 is in the OFF position, an "L" signal is fed to the NOR circuit 15 through a line "b". Indicated as 13 and 14 are resistors.

The NOR circuit 15 is coupled to a base electrode of a transistor 17 via resistor 16. The transistor 17 is coupled to an alarm 18 and a sender composed of an oscillator 20, an amplifier 19 and an antenna 21.

The above signaling device operates as follows. When the engine is started without using the ignition key 11, the pickup 1 detects the radio wave generated upon the start of the engine. Therefore, the transistor 9 is switched on, feeding an "L" signal to the NOR circuit 15 through the line "a". In this case, since the ignition switch 12 is not turned on, the NOR circuit 15 is also supplied with an "L" signal through the line "b". Since the two inputs of the NOR circuit 15 are both "L", the output from the NOR circuit 15 is an "H" signal. Thus, the transistor 17 is switched on, actuating the alarm 18 and the sender, whereby the alarm rings and a radio wave is transmitted from the antenna 21 to a receiver (not shown) for effecting the preventive signaling.

When the engine is started with the use of the key 11, the pickup 1 detects the radio wave, feeding an "L" signal to the NOR circuit 15 through the line "a". Since the ignition switch 12 is turned on, however, the signal fed to the NOR circuit through the line "b" is "H". Thus, the output from the NOR circuit 15 is "L" so that the transistor 17 is not switched on. Accordingly, no signal is generated for the actuation of the alarm 18 and the sender, i.e. the alarm 18 does not generate any alarm signal and no radio wave is transmitted from the antenna 21.

The signaling device according to the above described embodiment is provided with the alarm 18 and the sender as an alarm generating means. If desired, however, one of them can be eliminated. Further, the NOR circuit 15 may be replaced with any other known device such as a transformer having two separate primary windings and capable of generating an output when the directions of the magnetization in the two primary windings are in parallel with each other.

I claim:

1. A signaling device for indicating the attempted theft of an automobile, said automobile having an internal combustion engine provided within an engine compartment and adapted for starting operation by an ignition switch with the simultaneous generation of a radio wave, said device comprising:

first detecting means provided within the engine compartment for detecting the radio wave generated upon operation of the engine and adapted for generating a first detection signal upon detection of the radio wave;

second detecting means coupled to the ignition switch and adapted for generating a second detection signal when the ignition switch is in the off position;

means coupled to said first and second detecting means and capable of generating an actuation signal only when supplied with both of said first and second detection signals simultaneously; and alarm means having said actuation signal as its input and being adapted for signaling an alarm upon receipt of said actuation signal.

2. A signaling device for indicating the attempted theft of an automobile, said automobile having an internal combustion engine located within an engine compartment, said engine being startable in response to operation of an ignition switch and emitting radio waves when in operation, said device comprising:

a first condition-responsive means sensitive to the radio waves emitted during operation of the engine so as to provide either a first output indicative of a non-operating engine or a second output indicative of an operating engine;

a second condition-responsive means sensitive to the state of said ignition switch so as to provide either a first output indicative of an open switch or a second output indicative of a closed switch;

a selection means responsive to the outputs of both condition-responsive means so as to provide a first output indicative of a select one of the possible combinations of engine operating and ignition switch conditions, and to provide a second output distinguishable from said first output of said selection means for any other combination of engine operating and switch conditions; and means responsive to said first output of said selection means to generate an alarm signal.

* * * * *